United States Patent [19]

Takagi

[11] Patent Number: 5,726,518

[45] Date of Patent: Mar. 10, 1998

[54] SUPPORTING DEVICE OF RELATIVE MOVING ELEMENT OF VIBRATION ACTUATOR OR VIBRATION MOTOR

[75] Inventor: Tadao Takagi, Yokohama, Japan

[73] Assignee: Nikon Corporation, Tokyo, Japan

[21] Appl. No.: 706,963

[22] Filed: Sep. 3, 1996

Related U.S. Application Data

[63] Continuation of Ser. No. 376,438, Jan. 23, 1995, abandoned, which is a continuation of Ser. No. 81,845, Jun. 24, 1993, abandoned.

[30] Foreign Application Priority Data

Jul. 22, 1992 [JP] Japan ................... 4-195494
Jul. 22, 1992 [JP] Japan ................... 4-195497

[51] Int. Cl.$^6$ ........................................... H02N 2/00
[52] U.S. Cl. ........................................... 310/323
[58] Field of Search ................................ 310/323

[56] References Cited

U.S. PATENT DOCUMENTS

| | | | |
|---|---|---|---|
| 4,510,411 | 4/1985 | Hakamata et al. | 310/316 |
| 4,734,610 | 3/1988 | Okumura et al. | 310/323 |
| 4,812,699 | 3/1989 | Ogawa et al. | 310/316 |
| 4,935,659 | 6/1990 | Naka et al. | 310/323 |
| 4,980,597 | 12/1990 | Iwao | 310/323 |
| 5,049,774 | 9/1991 | Kuwabara et al. | 310/323 |
| 5,053,669 | 10/1991 | Saeki et al. | 310/323 |
| 5,066,884 | 11/1991 | Takagi et al. | 310/323 |
| 5,210,651 | 5/1993 | Shibuya et al. | 310/323 |
| 5,216,314 | 6/1993 | Suzuki | 310/323 |
| 5,254,899 | 10/1993 | Suzuki et al. | 310/323 |
| 5,311,094 | 5/1994 | Imasaka et al. | 310/323 |
| 5,319,278 | 6/1994 | Myohga et al. | 310/323 |
| 5,327,040 | 7/1994 | Sumihara et al. | 310/323 |
| 5,329,201 | 7/1994 | Shirasaki | 310/323 |
| 5,357,489 | 10/1994 | Luthier | 310/323 |
| 5,365,139 | 11/1994 | Kasuga et al. | 310/316 |

FOREIGN PATENT DOCUMENTS

| | | | |
|---|---|---|---|
| 60-245482 | 12/1985 | Japan | H02N 2/00 |
| 0136983 | 6/1988 | Japan | 310/323 |
| 0039272 | 2/1989 | Japan | 310/323 |
| 0231969 | 9/1990 | Japan | 310/323 |
| 2-290171 | 11/1990 | Japan | H02N 2/00 |

Primary Examiner—Thomas M. Dougherty
Attorney, Agent, or Firm—Shapiro and Shapiro

[57] ABSTRACT

A miniaturized ultrasonic motor comprises a stator having an elastic body on which a travelling oscillatory wave is generated and which is supported on a fixing unit in a manner that prevents rotation of the elastic body but permits axial movement of the elastic body. The travelling oscillatory wave rotates a rotor that contacts protruding portions of the elastic body, and the rotor rotates a driven body therewith. The driven body engages the rotor in a manner that constrains the driven body to rotate with the rotor but that permits relative axial movement of the driven body and the rotor body.

27 Claims, 4 Drawing Sheets

1

SUPPORTING DEVICE OF RELATIVE MOVING ELEMENT OF VIBRATION ACTUATOR OR VIBRATION MOTOR

This is a continuation of application Ser. No. 08/376,438 filed Jan. 23, 1995, which is a continuation of application Ser. No. 08/081,845 filed Jun. 24, 1993, both now abandoned.

BACKGROUND OF THE INVENTION

1. Field of the Invention

The present invention relates to a supporting device of a rotor and a stator of an ultrasonic motor (vibration motor) utilizing ultrasonic vibration.

2. Related Background Art

There have been known devices of this kind, for example, a device described in Japanese Patent Application Laid-open No. 2-290171, which is also by the present applicant.

Such a device supports a rotor and a stator which constitute an ultrasonic motor, while a flange is provided therein in order to attenuate vibration.

In the conventional device described above, however, as the flange for attenuating vibration is provided, the radial dimension of the ultrasonic motor becomes large.

SUMMARY OF THE INVENTION

For this reason, the object of the present invention is to provide an ultrasonic motor (vibration motor) miniaturized without derating performance.

In order to achieve the above-mentioned object the present invention has engagement units provided in the radial direction of the rotor so that a driven body is rotated by means of the engagement portions.

In order to achieve the above-mentioned object, the present invention further has engagement portions provided in the radial direction of an elastic body so that the elastic body is supported by the engagement portions on a fixing unit.

According to the present invention, since the ultrasonic motor has a construction in which the rotor (relative moving member) and the stator (vibration element) are supported by the engagement portions provided in the radial direction thereof, the ultrasonic motor can be miniaturized without derating performance.

DESCRIPTION OF THE PREFERRED EMBODIMENTS

Figure 1:
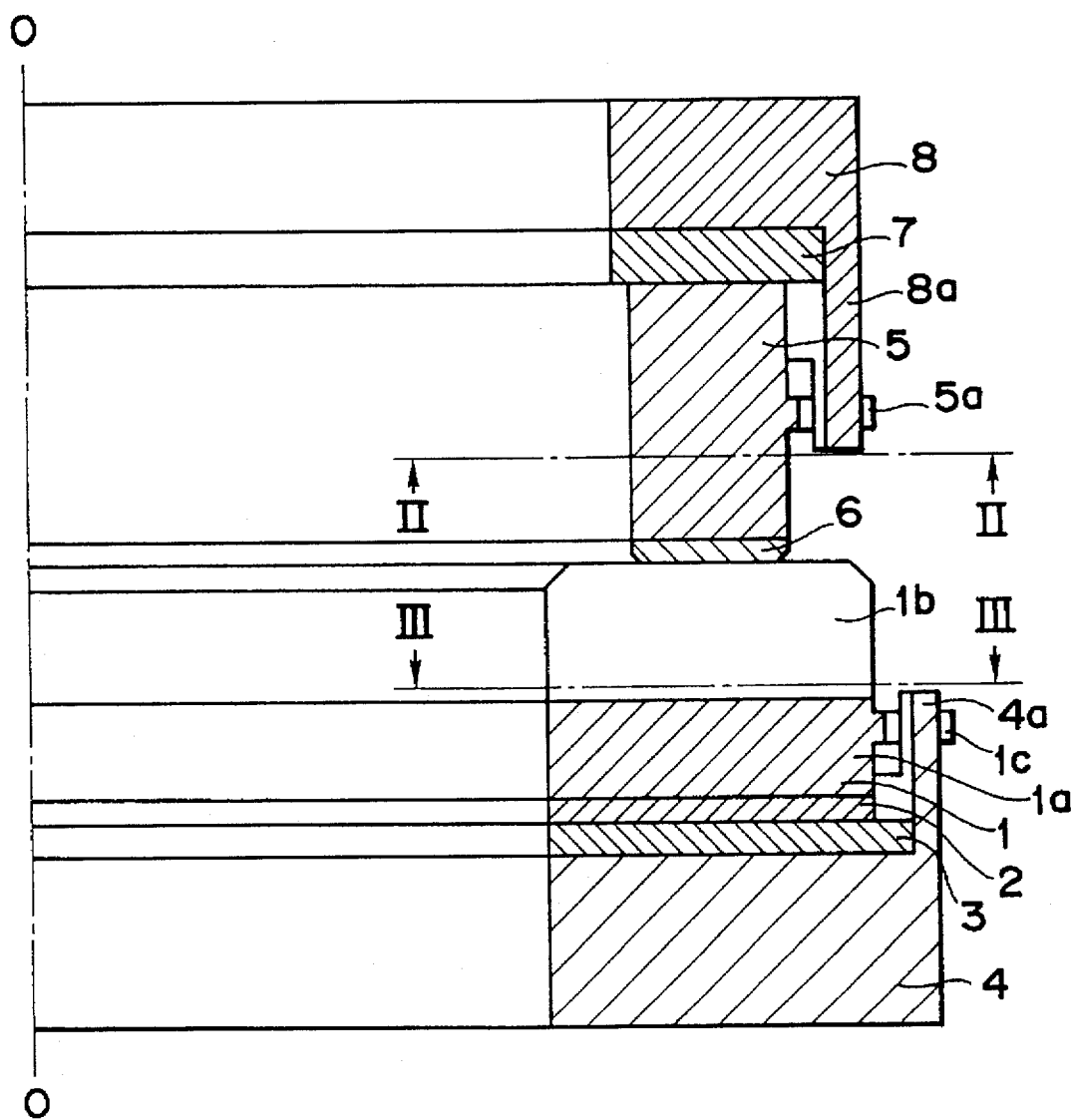
FIG. 1 is an axial cross-sectional view of the first embodiment of the ultrasonic motor according to the present invention.
Figure 2A:
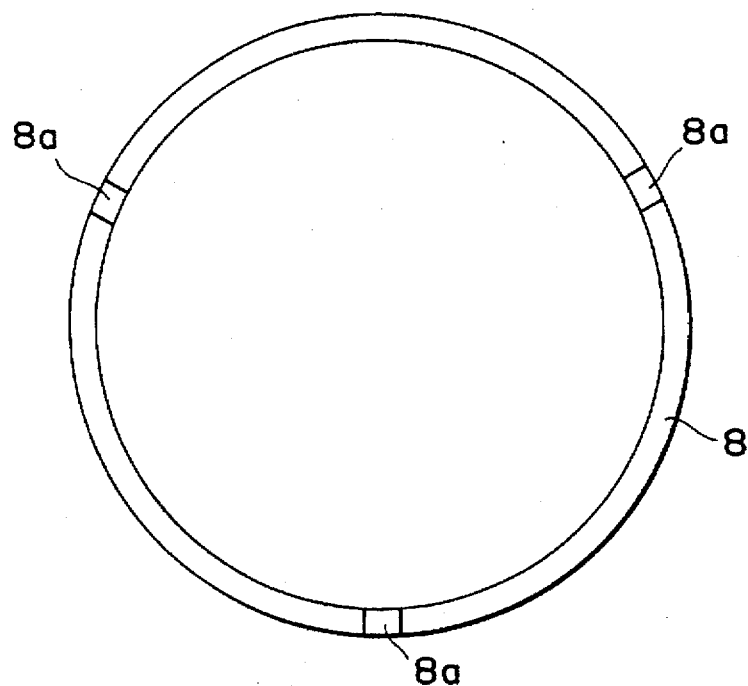
FIG. 2A is a view of the driven body portion 8 in FIG. 1, showing the cross section thereof cut along the line II—II shown in FIG. 1.
Figure 2B:
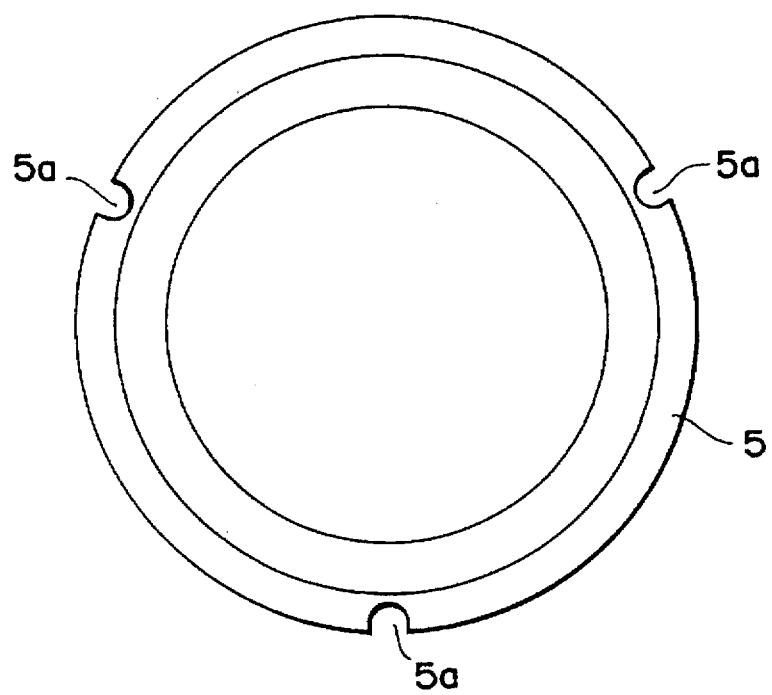
FIG. 2B is a view of the rotor 5 in FIG. 1, showing the cross section thereof cut along the line II—II shown in FIG. 1.
Figure 3A:
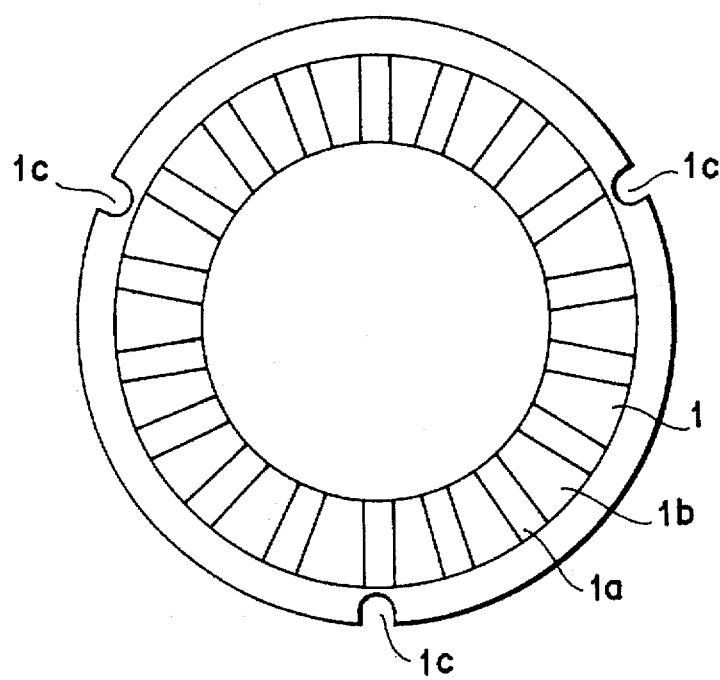
FIG. 3A is a view of the elastic body in FIG. 1, showing the cross section thereof cut along the line III—III shown in FIG. 1.
Figure 3B:
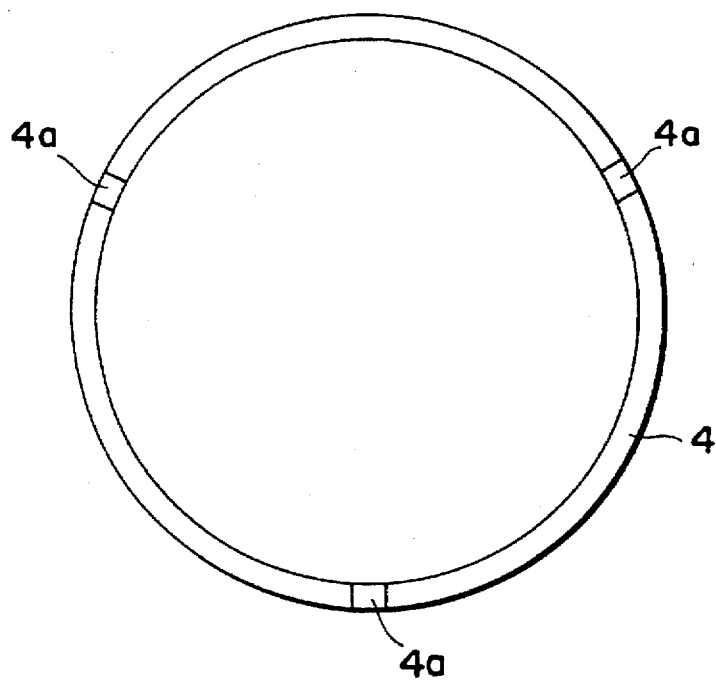
FIG. 3B is a view of the fixing portion in FIG. 1, showing the cross section thereof cut along the line III—III shown in FIG. 1.

FIG. 1 is an axial cross-sectional view of the ultrasonic motor according to the present invention; FIG. 2A is a view of the driven body unit 8, showing its cross section cut along the line II—II shown in FIG. 1; FIG. 2B is a view of the rotor 5, showing its cross section cut along the line II—II shown in FIG. 1; FIG. 3A is a view of the elastic body 1, showing its cross section cut along the line III—III shown in FIG. 1; and FIG. 3B is a view of the fixing unit 4, showing its cross section cut along the line III—III shown in FIG. 1.

The elastic body 1 consists of basement portion 1a and protruding portions 1b. The protruding portions 1b are provided in order to expand vibration amplitude. As shown in FIG. 3A, the protruding portions are arranged circumferentially so as to form radial fins. Engagement portions 1c, serving as detent stoppers, extend radially of the basement portion 1a so as to be engaged with a plurality of engagement portions 4a provided in the fixing unit 4. Said engagement portions 1c are provided in the neutral planes with respect to the elastic body 1 and minimize influence of the engagement portions 4a in the fixing unit 4 on vibration of the elastic body 1. Further, engagement between radially and axially extending surfaces of the engagement portions 1c of the elastic body 1 and the engagement portions 4a of the fixing unit 4 restrains relative movement of said engagement portions in the rotational and the radial directions, but not the direction 0-0 of the rotation axis.

High frequency voltage is applied to a piezo-electric body 2 from a power source (not shown), wherein vibration in correspondence to the voltage is generated. The piezo-electric body 2 is fixed to the elastic body 1 and a travelling oscillatory wave is generated in the protruding portions 1b of the elastic body 1. The principle that the travelling oscillatory wave is generated is described in detail, for example, in Japanese Patent Application Laid-open No. 60-245482 by the present applicant, so description thereof is omitted.

A vibration isolating member 3, made of felt, or the like, is provided between the vibration unit (piezo-electric body 2) and the fixing unit 4 in order to isolate vibration and to serve as a supporter in the direction of the rotation axis.

A slide member 6 bound to the rotor 5 receives the travelling oscillatory wave in the protruding portions 1b of the elastic body and is rotated. Engagement portions 5a extend radially of the rotor 5 to be engaged with a plurality of engagement portions 8a provided in the driven body, thereby serving as stoppers to prevent the rotor 5 from rotating with respect to the driven body 8. The engagement portions 5a are provided in the neutral planes with respect to the rotor 5 in order to minimize influence of the engagement portions 8a of the driven body 8 on vibration of the rotor 5. Further, engagement between radially and axially extending surfaces of the engagement portions 5a of the rotor 5 and the engagement portions 8a of the driven body 8 restrains relative movement of said engagement portions only in the rotational and the radial directions, but not in the direction 0-0 of the rotation axis.

A vibration isolating member 7, made of felt, or the like, is provided between the vibration unit (rotor 5) and the driven body 8 in order to isolate vibration and to serve as a supporter in the direction 0-0 of the rotation axis.

Figure 4:
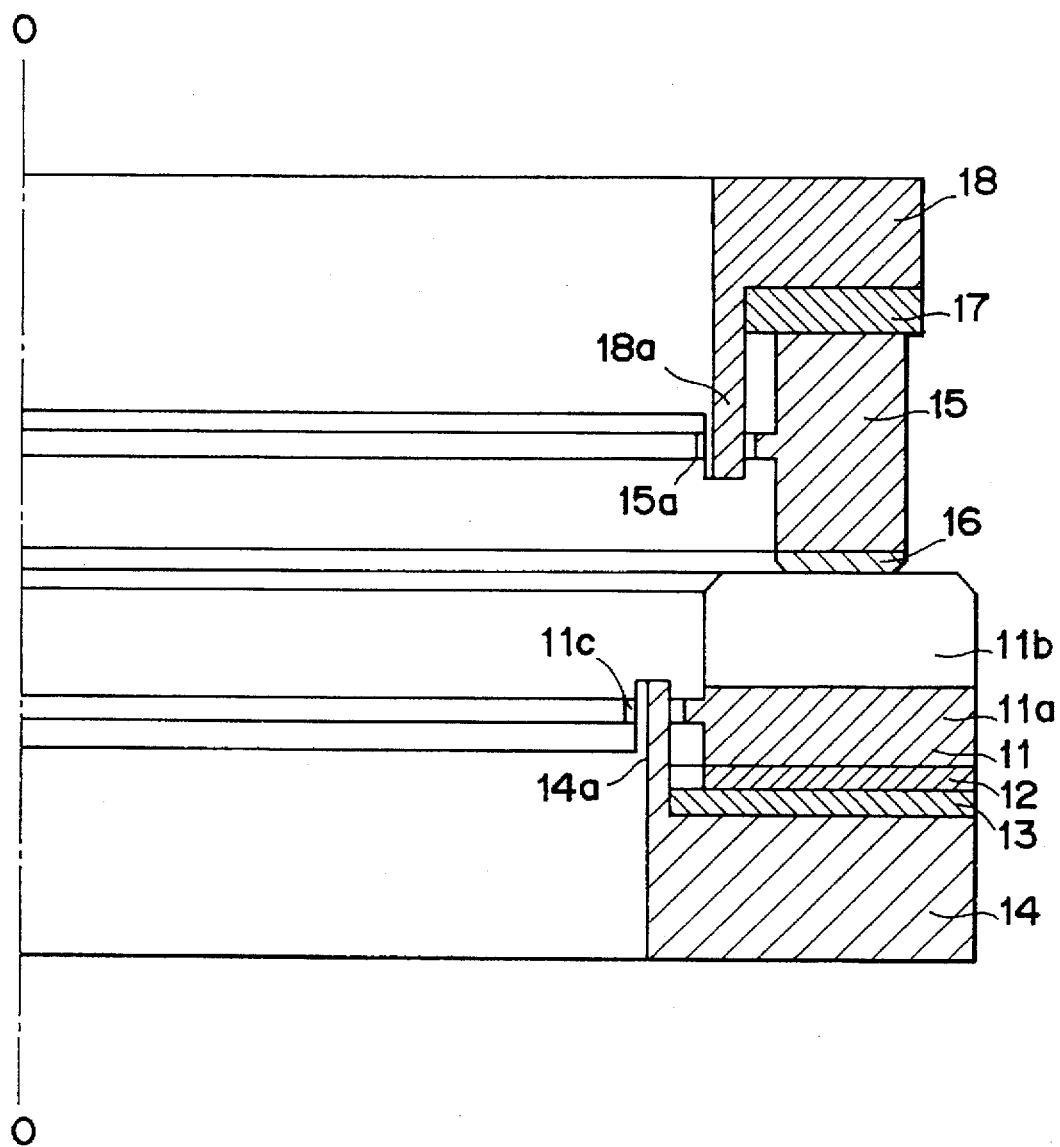
FIG. 4 is an axial cross-sectional view showing the of the second embodiment of the ultrasonic motor according to the present invention.

FIG. 4 is an axial cross-sectional view of the second embodiment of the ultrasonic motor according to the present invention.

The second embodiment is characterized in that the engagement portions 11c of the elastic body and the engagement portions 14a of the fixing unit, as well as the engagement portions 15a of the rotor and the engagement portions 18a of the driven body, are located on the respective inner peripheral sides thereof. Providing the elastic body and the rotor with engagement portions by itself, as well as effecting the engagement function, has a somewhat harmful effect on performance. It significant to provide engagement portions on the inner peripheral sides for the sake of improving performance, vibration amplitude and influence of engagement are smaller on the inner peripheral sides than in the outer peripheral sides.

As described above, since the ultrasonic motor according to the present invention has a construction in which the rotor and the stator are supported by the engagement portions provided radially, the ultrasonic motor can be miniaturized without derating performance.

What is claimed is:

1. A vibration motor comprising a relative moving element, a vibration element having an elastic body and an electro-mechanical transducer, said relative moving element being rotated by vibrations of said elastic body excited by said electro-mechanical transducer, and a driven body rotated by said relative moving element about a common rotational axis with said relative moving element, and further comprising means including surfaces on each of said relative moving element and said driven body that extend both radially and axially and that are mutually engaged for constraining said driven body to rotate with said relative moving element about said rotational axis but for permitting relative axial movement of said driven body and said relative moving element.

2. A vibration motor according to claim 1, wherein said radially and axially extending surfaces are positioned at outer peripheral portions of said relative moving element said driven body.

3. A vibration motor according to claim 1, wherein said relative moving element and said driven body are annular and said surfaces of said relative moving element and said driven body are positioned at inner peripheral portions of said relative moving element and said driven body.

4. A vibration motor according to claim 1, wherein said relative moving element has a neutral plane and said surfaces of said relative moving element are provided in the vicinity of said neutral plane of said relative moving element.

5. A vibration motor according to claim 1, wherein said drive body is axially supported on said relative moving element by a felt member.

6. A vibration motor according to claim 1, wherein said surfaces of said relative moving element are provided on protrusions extending radially from said relative moving element.

7. A vibration motor according to claim 1, wherein said mutually engaged surfaces of said relative moving element and said driven body are provided on respective engagement portions of said relative moving element and said driven body, one of said engagement portions projecting radially and the other of said engagement portions projecting axially.

8. A vibration motor comprising a vibration element having an elastic body and an electro-mechanical transducer, said elastic body being excited by vibrations of said electro-mechanical transducer, a relative moving element rotated about a rotational axis by the vibrations of the elastic body, and a fixing unit supporting the vibration element, and further comprising means including surfaces on each of said elastic body and said fixing unit that extend both radially and axially and that are mutually engaged for restraining said elastic body from rotating with said relative moving element about said rotational axis of the relative moving element but, concurrently with said restraining, permitting relative axial movement of said elastic body as a whole and said fixing unit.

9. A vibration motor according to claim 8, wherein said surfaces are positioned at outer peripheral portions of said elastic body and said fixing unit.

10. A vibration motor according to claim 8, wherein said elastic body and said fixing unit are annular and said surfaces are positioned at inner peripheral portions of said elastic body and said fixing unit.

11. A vibration motor according to claim 8, wherein said elastic body has a neutral plane and said surfaces of said elastic body are provided in the vicinity of said neutral plane of said elastic body.

12. A vibration motor according to claim 8, wherein said elastic body is axially supported on said fixing unit by a felt member.

13. A vibration motor according to claim 8, wherein said elastic body has a basement portion and said surfaces of said elastic body are provided on protrusions extending radially from said basement portion.

14. A vibration motor according to claim 8, wherein said mutually engaged surfaces of said elastic body and said fixing unit are provided on respective engagement portions of said elastic body and said fixing unit, one of said engagement portions projecting radially and the other of said engagement portions projecting axially.

15. A vibration motor comprising a fixing unit, a vibration element supported on said fixing unit and having an elastic body and an electro-mechanical transducer for exciting vibrations in said elastic body, a relative moving element driven by vibrations of said elastic body and a driven body driven by said relative moving element about a common rotational axis with said relative moving element, and further comprising:

means including surfaces on each of said elastic body and said fixing unit that extend both radially and axially and that are mutually engaged for restraining rotation of said elastic body relative to said fixing unit about said rotational axis of said relative moving element but permitting relative axial movement of said elastic body and said fixing unit; and means including surfaces on each of said driven body and said relative moving element that extend both radially and axially and that are mutually engaged for constraining said driven body to rotate with said relative moving element about said rotational axis but permitting relative axial movement of said driven body and said relative moving element.

16. A vibration motor according to claim 15, wherein said mutually engaged surfaces of said elastic body and said fixing unit are provided on respective engagement portions of said elastic body and said fixing unit, one of said engagement portions projecting radially and the other of said engagement portions projecting axially.

17. A vibration motor according to claim 15, wherein said mutually engaged surfaces of said relative moving element and said driven body are provided on respective engagement portions of said relative moving element and said driven body, one of said engagement portions projecting radially and the other of said engagement portions projecting axially.

18. A vibration motor comprising:
an electro-mechanical transducer;
an elastic body excited by said electro-mechanical transducer;

a relative moving element having a first engagement portion extending in a radial direction, said relative moving element adapted to be rotated by vibrations of said elastic body; and a driven body having a second engagement portion extending in said radial direction, said driven body adapted to be driven by said relative moving element, wherein said first and second engagement portions are engaged with each other in such a manner that said relative moving element and said driven body rotate about a common rotational axis in unison while said driven body is permitted to move along the common rotational axis.

19. A vibration motor according to claim 18, wherein said first and second engagement portions are positioned on an outside or an inside of said relative moving element.

20. A vibration motor according to claim 18, wherein said relative moving element has a neutral plane and said first engagement portion is provided in the vicinity of said neutral plane.

21. A vibration motor according to claim 18, wherein said relative moving element is supported by a felt on said driven body in the direction of the rotational axis.

22. A vibration motor comprising:

a vibration element having an electro-mechanical transducer and an elastic body excited by said electro-mechanical transducer; and a relative moving element to be driven with vibrations of said elastic body;

wherein said elastic body has a basement portion and a plurality of protruding portions which are provided in said basement portion, said plurality of protruding portions extending in a direction of a rotational axis of said relative moving element so as to be in contact with said relative moving element, said basement portion having a first engagement portion which extends in a radial direction of said basement portion, a fixing unit having a second engagement portion which extends in the radial direction, wherein by engaging said first engagement portion with said second engagement portion, said fixing unit inhibits said vibration element from rotating about said rotational axis while said fixing unit permits said vibration element to move in the direction of the rotational axis.

23. A vibration motor according to claim 22, wherein said first and second engagement portions are positioned on an outside or an inside of said vibration element.

24. A vibration motor according to claim 22, wherein said vibration element has a neutral plane and said first engagement portion is provided in the vicinity of said neutral plane.

25. A vibration motor according to claim 22, wherein said vibration element is supported by a felt on said fixing unit in the direction of the rotational axis.

26. A vibration actuator comprising:

a vibration element having an elastic body and an electro-mechanical transducer, said elastic body being excited by vibrations of said electro-mechanical transducer and having an engagement portion which extends in a radial direction;

a relative moving element rotated about a rotational axis by the vibrations of the elastic body; and a fixing unit supporting the vibration element, wherein said fixing unit supports said vibration element with mutual engagement of said engagement portion of said elastic body and said fixing unit, and restrains said elastic body from rotating with said relative moving element about said rotational axis of said relative moving element, but, concurrently with the restraining, permits relative axial movement of said elastic body as a whole and said fixing unit.

27. A vibration actuator according to claim 26, wherein an engaging surface of said engagement portion of said vibration element moves relative to an engaging surface of said fixing unit along said rotational axis to permit relative axial movement of said elastic body and said fixing unit when movement along said rotational axis occurs between said elastic body and said fixing unit.

* * * * *